Nov. 25, 1952 O. LUNDSTROM 2,619,540
ULTRAHIGH-FREQUENCY POWER MEASURING APPARATUS
Filed Jan. 24, 1947 2 SHEETS—SHEET 1

INVENTOR
OSCAR LUNDSTROM
BY
Paul B. Hunter
ATTORNEY

Nov. 25, 1952     O. LUNDSTROM     2,619,540
ULTRAHIGH-FREQUENCY POWER MEASURING APPARATUS
Filed Jan. 24, 1947     2 SHEETS—SHEET 2

INVENTOR
OSCAR LUNDSTROM
BY
Paul B. Hunter
ATTORNEY

Patented Nov. 25, 1952

2,619,540

UNITED STATES PATENT OFFICE 2,619,540

ULTRAHIGH-FREQUENCY POWER MEASURING APPARATUS

Oscar Lundstrom, Hempstead, N. Y., assignor to The Sperry Corporation, a corporation of Delaware Application January 24, 1947, Serial No. 723,945

5 Claims. (Cl. 178—44)

1

This invention relates to power measuring devices operating at ultra-high or super-high frequencies and concerns, particularly, apparatus which may be operated successfully over a wide range of frequencies.

At ordinary radio frequencies, the power level in a circuit may be found by measuring the voltage across or the current through an impedance which is known or measurable, but at higher frequencies, approaching the microwave region above 300 mc./sec., accurate voltage and current meters become increasingly difficult to construct. Furthermore, at such higher frequencies most circuit elements are composed of or connected by transmission lines of appreciable electrical length, which are subject to standing waves. The voltage and current measurements must then be made at precisely the location of the known impedance or a known distance away, or values must be measured at a multiplicity of points along the input transmission line. It is, therefore, necessary at some point to turn to different methods for the measurement of power.

One such technique employed in the superhigh frequency or microwave region is the bolometric or hot-wire type of wattmeter. The heart of such a bolometric wattmeter is a sensitive resistive element whose resistance changes with temperature and whose temperature depends upon the electrical power being dissipated in the resistance. The resistive element in these measurements may take the form of a short length of fine wire. This element is placed in one arm of a direct current bridge and is heated by direct current until its resistance reaches a value that brings the bridge to balance. It is further heated by the microwave power which is desired to measure, and the addition of this power causes a change in resistance which will unbalance the bridge. The unbalance indication in the galvanometer of the bridge may then be used to measure the amount of microwave power.

Such bolometers are usually conected into the transmission line carrying the power to be measured, by the use of a special holder adapted for this purpose If the hot-wire element is to absorb substantially all the power in the incident wave it is necessary that the bolometer and its holder be well matched to the input transmission line. This matched condition must exist in the entire frequency range over which the wattmeter is to be operated.

It is also advantageous to have a bolometer which may be readily adapted to a variety of holders, as this simplifies the replacement prob-

2 lem. A further advantage is realized if the holder is of the non-tunable broad-band type. This permits replacement of the bolometer without requiring returning of the holder to maintain the desired high-frequency impedance properties. Simplicity and flexibility of operation also demand that the desired impedance properties be maintained over the widest possible range of frequencies.

It is, therefore, an object of this invention to provide an improved hot-wire bolometer element and an improved holder for such hot-wire element having some or all of the above-discussed desirable qualities.

Another object of the invention is to provide a concentric line hot-wire holder which may readily be opened for replacement of the hot-wire element.

Another object is to provide a hot-wire holder which will match the hot-wire element to the concentric transmission line over a wide range of frequencies.

The invention also relates to the novel features or principles of the instrumentalities described herein, whether or not such are used for the stated objects, or in the stated fields or combinations.

A still further object of the invention is to provide a broad-band wattmeter which eliminates the necessity for tuning the holder while permitting operation over a wide range of frequencies.

Briefly, a wattmeter constructed in accordance with this invention has the hot-wire bolometer element inserted at the end of a section of coaxial line, the element itself being essentially an extension of the inner conductor with the other end of the wire terminating on a coaxial line shorting member serving to provide a short-circuiting termination for said line. Mounting the element adjacent a coaxial line short guarantees its being positioned at a current loop, thereby providing more accurate power measurements. If the hot-wire is operated at a resistance near the characteristic impedance of the input line, the bolometer element in a fixed tuned holder will present a suitable matched load to the input line from a very low frequency up to a frequency at which the reactance of the wire reaches an appreciable magnitude. The high frequency limit may be further extended according to the invention by using the "discontinuity capacity" effect at the point where the wire is attached to the center conductor to resonate the wire inductance, and by using a hot-wire resistance definitely different from the input line characteristic impedance.

For a better understanding of the present invention, together with other and further objects thereof, reference is added to the following description taken in connection with the accompanying drawings, where Fig. 1 is a diagrammatic sketch of a hot-wire type bolometer element connected to an ultra-high-frequency generator and input transmission line and to the power-measuring bridge circuit showing the system in which the present invention is used;

Figure 1:
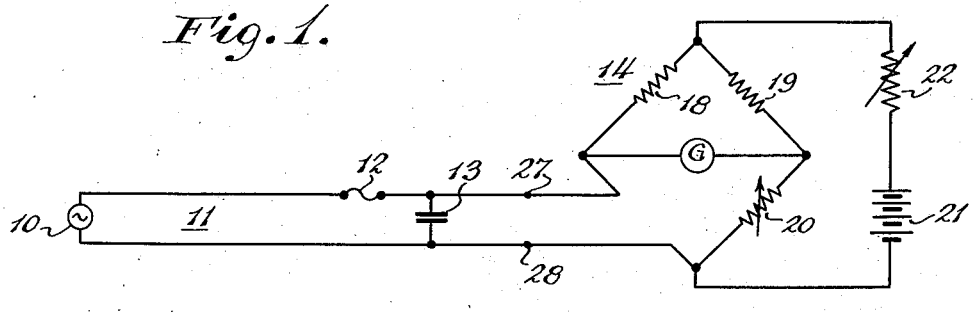

Referring now more particularly to Fig. 1 there is shown a diagrammatic sketch of a hot-wire-type bolometer element, as in the present invention, connected to a power measuring bridge circuit. A generator 10 which supplies ultra-high- or super-high-frequency energy, whose power level is to be measured, is connected to a transmission line 11. Hot-wire element 12 is connected in series with one of the legs of transmission line 11, and a by-pass condenser 13 serves to complete the alternating current circuit. Bridge circuit 14 is of the conventional Wheatstone type having resistors 18, 19 and 20 as three arms thereof, hot-wire 12 forming the fourth arm. Battery 21 is connected across one diagonal of the bridge circuit 14 and supplies direct current thereto through an adjustable resistor 22 which is used to control the amount of current supply. Galvanometer G is connected to the other bridge diagonal and is used to measure bridge unbalance. The direct current path in the fourth arm connected between terminals 27 and 28 of bridge 14 may be completed by a conventional stub support along transmission line 11 (not shown) or may be made through the generator 10 at the end of transmission line 11.

Briefly, in operation, bridge circuit 14 is balanced with generator 10 in a non-operative condition. Current supplied by battery 21 is used to heat element 12, changing its resistance and thereby balancing the bridge. Balance may also be adjusted by varying resistor 20. As microwave energy is transmitted along line 11 by generator 10, the hot-wire element 12 is further heated by the microwave power. The heating effect of the microwave power causes the hot-wire element 12 to change its resistance which will, in turn, unbalance the bridge circuit 14. The unbalance indication in galvanometer G may then be used to measure the amount of microwave power being transmitted down line 11. Calibration may be accomplished by first balancing the bridge with direct current and then noting the unbalance caused by adding a known amount of low frequency power to the sensitive element, or else the bridge may be balanced with direct current alone, and then rebalanced after addition of the microwave power. The microwave power is then said to equal the amount of direct current power that it was necessary to subtract from the bolometer in order to regain the balanced condition.

Figure 2:
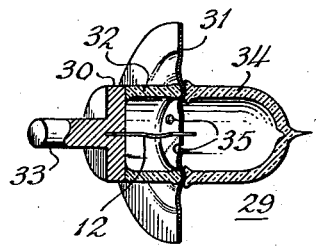
Fig. 2 is a longitudinal cross-sectional prospective view of the bolometer element constructed in accordance with this invention.

Fig. 2 shows the bolometer element 29 constructed in accordance with the present invention. The hot-wire 12 is suspended between and along the axes of two metallic disc members 30 and 31 which are separated by and mutually vacuously sealed to glass cylinder member 32. Disc 30 has a diameter equal to the inner conductor of the coaxial transmission line which the bolometer 29 is to terminate. A prong 33, extending along the axis of disc 30, is adapted to be inserted into the end of the coaxial transmission line so as to center the unit and to provide good electrical contact and mechanical stability thereto. Glass cap 34 sealed to the other side of disc 31 is used in sealing off the evacuated chamber surrounding element 12, holes 35 in disc 31 being provided to permit evacuation of this chamber. The diameter of disc 31 is somewhat greater than that of the disc 30, and it is preferably so thin as to be flexible, for purposes discussed below.

Figure 3:
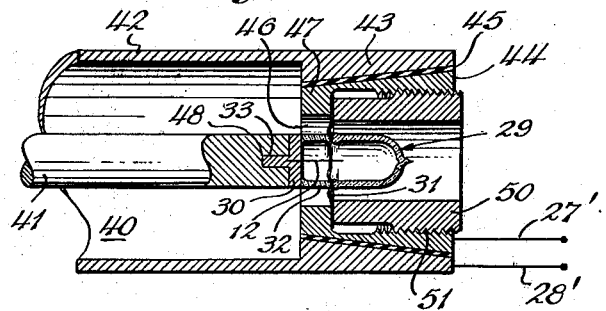
Fig. 3 is a longitudinal cross-sectional view of the end of an input coaxial line with the bolometer element of Fig. 2 inserted, showing the bolometer element holder of the present invention.

Fig. 3 shows the bolometer element 29 terminating a coaxial line 40 having inner conductor 41 and outer conductor 42. Outer conductor 42 terminates in an inner flange portion 43 having a tapered bore. Bucket-shaped member 44, having a tapered outer wall, is fitted into tapered flange member 43, dielectric tape 45 being inserted between members 43, 44 and serving to insulate them electrically from one another. A circular opening 46 is provided in the center of flat end portion 47 of member 44 to permit the insertion of bolometer element 29. Prong 33 fits into an axial bore 48 in the butt end of inner conductor 41 permitting disc 30 to make flush contact with the end of the inner conductor 41. The thickness of the end portion 47 of member 44 is made substantially the same as the length of glass cylinder member 32 of bolometer 29. This permits disc member 31 to make contact with the inner face of the end portion 47. Cylindrical plug member 50, having a threaded outer wall, engages threads 51 formed on the inner wall of member 44 and clamps disc 31 between it and end portion 47 to provide good contact therebetween as well as between disc 30 and the butt end of inner conductor 41. The flexible character of disc 31 permits self-alignment if any slight inaccuracy of dimension exists.

The complete bolometer holder assembly is so designed so that the point at which element 12 attaches to disc 30 is substantially in the plane of the outer face of end portion 47 of member 44 which, in turn, coincides with the inner end of flange member 43. The result of this geometry is a sharp decrease in the inner diameter of the outer conductor 42 at the same point along the coaxial transmission line 40 as the decrease in the diameter of the inner conductor 41.

Electrical connection is made to outer conductor 42 by lead wire 28' and to member 44 by lead wire 27'. These lead wires are connected to terminals 27 and 28 of bridge circuit 14 as shown schematically in Fig. 1, and power measurements are made in the manner described above.

As pointed out above, if the hot-wire element 12 is to absorb substantially all the power in the incident wave, it is necessary that the bolometer 29 an its holder assembly be matched to the section of transmission line 40 which it terminates. Otherwise, a fraction of the incident power will be reflected and the resulting power indication will of necessity be lower than the amount of incident power transmitted along the line 40 which is to be measured.

The reflected energy creates standing waves in the transmission line. By measuring the ratio of the amplitudes of the voltage loops or antinodes to the amplitude of the voltage nodes, a figure representing the matched condition is obtained. This is referred to in the art as the voltage standing wave ratio and is abbreviated as VSWR. In designing microwave power transmission equipment, it is desirable to keep the VSWR minimized so that little power is lost by reflection.

The amount of mismatch (the magnitude of the VSWR) that is permissible depends, of course, upon the use which the wattmeter is to be put. However, for great precision in power measurements, the VSWR must be kept to a small value. It is not necessary that it be the same at all frequencies, but it is necessary that it shall not exceed the design value at any point in the range of frequencies over which the wattmeter is to measure power.

By making the wattmeter of the tunable type, it is possible to obtain a low VSWR at a given frequency, but if the operating frequency is changed, the device must be retuned in order to maintain the low VSWR. Even in such a tunable device, however, there are tuning limits beyond which it is not possible to maintain the desired VSWR.

Figure 4:
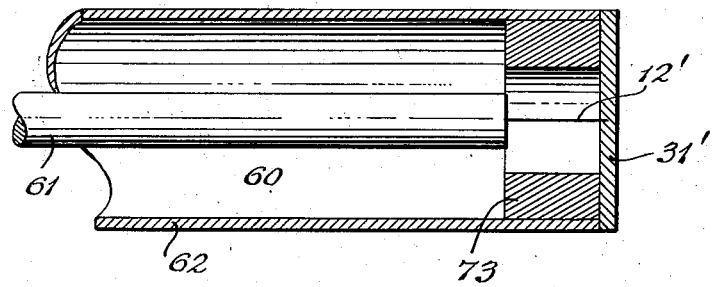
Fig. 4 is a schematic longitudinal cross-section of a coaxial line terminated in a hot-wire element, useful in explaining the theory behind the present invention.
Figure 4A:
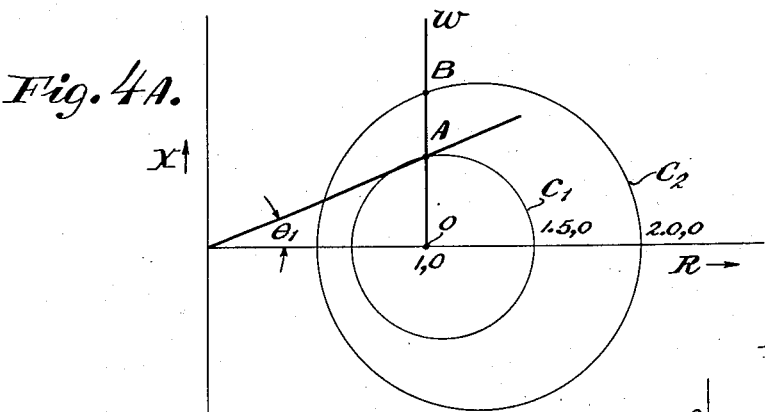
Fig. 4A is a circle diagram showing the impedance relations which exist in a conventional device.
Figure 4B:
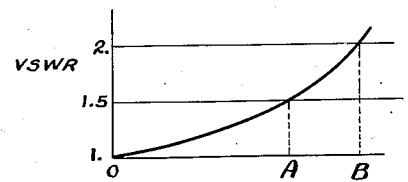
Fig. 4B is a plot of the variation of voltage standing wave ratio with frequency.

Just how the VSWR changes with frequency in a particular device may be seen by reference to Figures 4A and 4B. Fig. 4 is a longitudinal cross-section of a section of coaxial line 60 having an inner conductor 61 and an outer conductor 62. Resistor element 12', which may be the hot-wire of the invention, connected to the butt end of inner conductor 61, terminates upon shorting member 31' which seats upon and closes the butt end of outer conductor 62.

Fig. 4A is a conventional impedance or circle diagram which is useful in explaining the operation of the device shown in Fig. 4. A discussion of the use of such circle diagrams is given in chapter 8, page 55, of the book "Principles of Radar" written by the MIT Radar School staff and published by McGraw-Hill, 1946. The diagram in Fig. 4A can be used to show how the impedance of element 12' varies with operating frequency and further to show the condition of mismatch that exists between transmission line section 60 having 61 as its inner conductor and the transmission line section having element 12' as its inner conductor.

In Fig. 4A, the abscissa axis represents a normalized resistance R equal to the resistance of element 12' coupled to line 60, divided by the characteristic impedance $Z_c$ of line 60. Similarly, the ordinate axis represents the normalized reactance X equal to the reactance element 12' divided by $Z_c$. Point 0 having coordinates (1,0) represents the characteristic impedance $Z_c$.

A series of circles $C_1$, $C_2$ is superimposed upon the usual rectangular coordinates. These circles have their centers on the axis of abscissae and pass through points on the abscissae axis having reciprocal abscissae values. As plotted, each of these circles represent the locus of impedance values which, when coupled at the end of line 60, will produce a constant mismatch condition and, as such, may be referred to as constant voltage-standing-wave-ratio circles. For illustration, circle $C_1$ may represent a VSWR of 1.5, and $C_2$ a VSWR of 2.0.

If element 12' is designed to have an ohmic resistance value equal to the characteristic impedance of line 60, its normalized value R would be represented by point 1,0 on the circle diagram. However, if the device is to be used at high frequencies, the element 12' will begin to exhibit its inductive properties with the result that its impedance ceases to be pure resistance but has an inductive reactive component which increases with the operating frequency. The resulting impedance locus of the element 12' with varying frequency is then the vertical line OW on the graph. It will be noted that the resistive component does not change, but that the reactive component increases. This is due, of course, to the increased inductive reactance which element 12' exhibits as the operating frequency is increased.

If the operating frequency is extremely low, the impedance of element 12' approaches a pure resistance chosen equal to the impedance of the transmission line 60 itself. This, of course, represents a matched condition and allows for the maximum possible transfer of power. However, as the frequency is increased and the hot-wire impedance begins to have a positive reactive component, a certain amount of mismatch occurs. At point A on Fig. 4A there is indicated by the length OA the maximum amount of inductive reactance which element 12' may exhibit and still have a VSWR less than 1.5. As the frequency is increased and the resulting inductive reactive component increases to point B, it is seen that the standing-wave-ratio has now reached the value of 2.0. It is therefore seen that for a given permissible standing wave ratio there is an upper operating frequency limit at which this standing wave ratio is reached. The tangent of the angle $\theta_1$ is proportional to the operating frequency at point A.

Fig. 4B is a plot of the voltage standing wave ratio against the impedance of element 12', which, in turn, is a function of the operating frequency. It will be seen that at point 0 the standing wave ratio is unity. This, of course, is the perfect match condition. As the impedance increases to point A, the voltage standing wave ratio has now reached a value equal to 1.5 and a further increase in the impedance of element 12' to point B causes the VSWR to reach a value of 2.

Figure 5A:
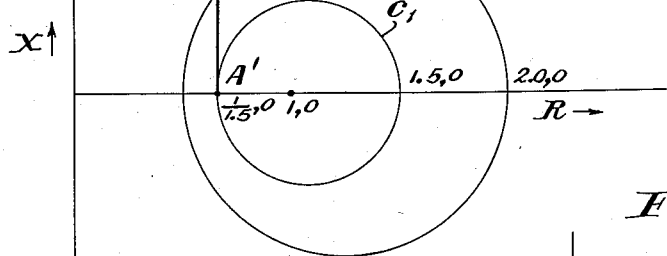
Fig. 5A is a circle diagram showing the impedance relations which exist in the device shown in Fig. 4.

In order to increase the range of frequencies over which the hot-wire element 12' is matched within a permissible VSWR, such as 1.5, reference is made to Fig. 5A, which is another circle diagram representing the impedance characteristics of the device shown in Fig. 4. In Fig. 5A the resistance of element 12' is no longer taken as equal to the line characteristic impedance $Z_c$, but is reduced by a factor equal to the reciprocal of the maximum allowable VSWR, which is taken to be 1.5 for the present example. Therefore, the ohmic resistance of element 12' is represented by point A', having coordinates $$\left(\frac{1}{1.5}, 0\right)$$

By so reducing the resistance it can be seen that, as the operating frequency is increased, the presence of any reactance in the element 12' immediately causes the VSWR to exceed the permissible value 1.5, since the locus of the impedance of element 12' now is line A'W'.

Figure 5C:
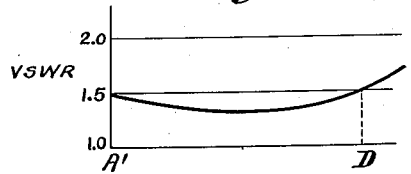
Fig. 5C is a plot of the variation of voltage standing wave ratio with frequency.
Figure 5B:
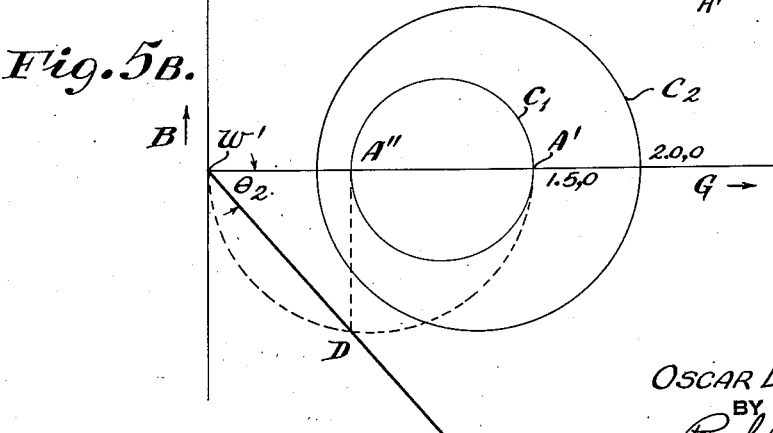
Fig. 5B is a similar admittance circle diagram.

Fig. 5B is an admittance diagram equivalent to the impedance diagram of Fig. 5A. Each point in Fig. 5B is the inversion of the corresponding point of Fig. 5A, corresponding points being designated by the same letter. Thus, circles $C_1$ and $C_2$ are the same in the two diagrams. The normalized ohmic conductance of element 12' is given by point A' of Fig. 5B, having coordinates (1.5,0). The line A'W' of Fig. 5A, representing the locus of the impedance values of element 12', become semi-circle A'W' of Fig. 5B. It is immediately seen that all points on the admittance curve A'W except A' fall outside of the VSWR=1.5 circle.

By adding a positive susceptance of sufficient value to the admittance of element 12', a large portion of the resultant admittance locus curve will then fall inside the 1.5—VSWR circle. The addition of such a susceptance (by coupling a capacitive element in parallel with element 12') permits the input admittance to line 60 to become real at one frequency in addition to "zero" frequency (point A').

According to an important feature of the present invention, the proper susceptance is added to produce as wide a frequency range as possible, without exceeding the permissible VSWR value.

Referring to Fig. 5B; point A'' represents the inverse of point A', still on the circle $C_1$ of permissible VSWR. Now, if susceptance A''D is added to the circuit, point D of the semi-circle A'W' will be moved to point A'', and the input admittance at the frequency corresponding to point D will be a pure conductance. As at point A', the standing wave ratio will be 1.5. The addition of the susceptance A''D will bring all points on the admittance curve between A' and D inside the VSWR=1.5 circle. Reference to Fig. 5C shows a plot of the VSWR against frequency. It is seen that the value of the VSWR is 1.5 at points A' and D. Between these points it is always less than the allowed value 1.5. The increased frequency range brought about by the addition of the susceptance can be seen by comparing the magnitudes of $\theta_1$ and $\theta_2$, the tangents of their angles being proportional to the upper operating frequency limits.

The susceptance which must be added to the admittance of element 12' should have a positive value, that is, it should be a capacitive susceptance. According to the present invention, the capacity which is added in parallel with the line is in the form of a so-called "discontinuity capacity." A complete treatment of discontinuity capacity is presented in an article entitled Coaxial-Line Discontinuities by Whinnery, Jamieson and Robbins, appearing in the November 1944 issue of the Proceedings of the IRE. In this paper, it is shown that the effect of certain step-type discontinuities in coaxial transmission lines is the same as the placing of an admittance between the inner and outer conductors of the transmission line at the point of the discontinuity. It is further pointed out that if the transverse dimensions of the discontinuity are a small fraction of a wavelength at the operating frequency, the discontinuity admittance is purely capacitive.

The required discontinuity capacity is provided by element 73, in Fig. 4, which causes a discontinuity in the outer conductor to occur at the same point along the transmission line as the discontinuity introduced by the change in the inner conductor where element 12' joins inner conductor 61, and determines the magnitude of the total capacitive susceptance introduced in the line, since the discontinuity introduced at the inner conductor is fixed by the necessary size of the hot-wire 12 required for bridge 14. Formulas are given in the paper referred to for calculating the required physical discontinuity necessary to add a desired amount of susceptance. The magnitude of the susceptance is, of course, obtained from a circle diagram such as Fig. 5B.

In Fig. 3, flat end portion 47 serves the same function as cylinder 73 in Fig. 4, namely, to supply the outer conductor discontinuity and thereby introduce a given amount of capacitive susceptance across the line at the point where hot-wire element 12 joints inner conductor 41.

From the above discussion it is thus possible to design a bolometer element and holder which will give the maximum operating range of frequencies without exceeding a permissible voltage standing wave ratio. Since the resistance of the element alone determines the impedance mismatch with the transmission line to which it is connected, its value is selected so that the VSWR at zero frequency equals the permissible value. Thus the resistance of the element is set at $$\frac{1}{\sigma} \cdot Z_c$$

where $\sigma$ is the permissible VSWR and $Z_c$ is the characteristic impedance of the transmission line. The material and dimensions of the element are selected to give the necessary resistance value, consideration being given to the amount of power which the element must dissipate.

The resulting element is in the shape of a rod-like filament and as such will exhibit inductive properties. This causes the impedance properties of the element to have a reactive component whose magnitude increases with increased operating frequencies. Since the VSWR presented by the mismatch between the transmission line and the hot-wire element equals the maximum permissible value at zero frequency, as the operating frequency is increased, the VSWR will be increased due to the addition of inductive reactance to the resistance of the element.

By the addition of capacitive susceptance in parallel with the bolometer element it is possible to electrically cancel the inductive reactance at some high frequency so that the element will present an impedance which is a pure resistance as at zero frequency. The VSWR at this high frequency will again be the maximum permissible value, and will be less than the maximum permissible value at all operating frequencies between zero at the upper limiting operating frequency.

Knowing the inductive properties of the element, which can be determined from its physical dimensions, it is possible by the use of circle diagrams to determine both the magnitude of the capacitive susceptance which must be added and the upper operating frequency. The desired amount of capacitive susceptance may then be built into the holder by applying the formulas as given by Whinnery.

This procedure gives the steps in the design of a bolometer element and holder which has the broadest range of operating frequencies without exceeding a permissible VSWR and gives wide latitude in the selection of the element material in view of the power dissipation requirements.

The present invention, therefore, provides a bolometer or hot-wire element in a coaxial line section adjacent a line short. It further provides a bolometer holder which permits rapid and easy interchange of bolometer elements. Further, by designing the bolometer holder so that it introduces a predesigned amount of discontinuity capacity, a bolometer element is provided which operates over a wide range of frequencies without exceeding a fixed VSWR. The operating band of frequencies has no lower limit, inasmuch as the permissible VSWR is not exceeded at any operating frequency between the upper operating limit down to direct current.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Certain subject matter shown in the present application has been claimed in application S. N. 117,088, filed September 22, 1949, now Patent No. 2,522,525, granted September 19, 1950.

What is claimed is:

1. A high frequency power-measuring device comprising a section of coaxial line having an inner and an outer conductor, an impedance element providing an extension of said inner conductor and having a smaller diameter than that of said inner conductor, whereby a discontinuity is formed along said inner conductor providing a discontinuity capacitance, said element having a resistance varying with its temperature and also having a reactance varying with the operating frequency, said resistance being chosen substantially equal to the characteristic impedance of said line divided by the maximum voltage standing wave ratio permissible in said line, means providing an electrical high-frequency short-circuiting connection between said outer conductor and the end of said element remote from said inner conductor, and means for increasing the frequency range of said device, comprising means providing further discontinuity capacity at the junction of said element and said inner conductor, the total capacitive susceptance offered by said first and said further discontinuity capacities being substantially equal to the inductive susceptance of said element at the frequency at which the ohmic conductance of said element equals the characteristic admittance of said line divided by the said maximum permissible voltage standing wave ratio.

2. A high frequency power measuring device comprising a section of coaxial line having an inner and an outer conductor, an impedance element forming an extension of said inner conductor with a discontinuity between it and said inner conductor, said element having a resistance substantially equal to the characteristic impedance of said line divided by the maximum voltage standing wave ratio permissible in said line, and also having inductance, and means for increasing the operating frequency range of said device, comprising a discontinuity in said outer conductor providing a capacitive susceptance at the junction between said element and said inner conductor substantially equal to the inductive susceptance of said element at the frequency at which the total conductance of said element substantially equals the characteristic admittance of the line divided by the low frequency conductance thereof.

3. A device as in claim 2 wherein said element comprises a resistance wire coaxial with said inner conductor, and said discontinuity susceptance-providing means comprises a means defining a reduced-diameter portion of said outer conductor surrounding said wire.

4. A high frequency power-measuring device comprising a coaxial line section having an inner conductor and an outer conductor, a variable resistance element having a pair of aligned parallel conductive discs and a variable impedance filament connected therebetween, said discs being of different sizes and the smaller of said discs being adapted to be connected at one end of the inner conductor of said line section as an extension thereof, means providing a reduced diameter section of the outer conductor of said line immediately surrounding and substantially co-extensive with said filament, and further means adapted to hold the larger of said disc members against the end of said reduced diameter section farthest from said inner conductor end to provide a connection between one end of said filament and said outer conductor.

5. Apparatus as in claim 4 further including means providing D. C. isolation and an A. C. short-circuit between said outer conductor reduced-diameter section and the remainder of said outer conductor.

OSCAR LUNDSTROM.

REFERENCES CITED

The following references are of record in the file of this patent:

UNITED STATES PATENTS

| Number | Name | Date |
| --- | --- | --- |
| 1,921,117 | Darbord | Aug. 8, 1933 |
| 1,932,448 | Clavier | Oct. 31, 1933 |
| 1,937,652 | Green | Dec. 5, 1933 |
| 2,284,379 | Dow | May 26, 1942 |
| 2,365,207 | Moles | Dec. 19, 1944 |
| 2,399,674 | Harrison | May 7, 1946 |
| 2,407,075 | Gurewitsch | Sept. 3, 1946 |
| 2,411,553 | Ramo | Nov. 26, 1946 |
| 2,423,461 | Meahl | July 8, 1947 |
| 2,423,476 | Billings et al. | July 8, 1947 |
| 2,427,752 | Strempel et al. | Sept. 23, 1947 |
| 2,432,100 | Kircher | Dec. 9, 1947 |
| 2,434,610 | Feicker | Jan. 13, 1948 |
| 2,463,436 | Sorvaag | Mar. 1, 1949 |
| 2,488,378 | Coltman | Nov. 15, 1949 |
| 2,495,752 | Montgomery | Jan. 31, 1950 |

OTHER REFERENCES

Publication by F. J. Gaffney in "Proc. I. R. E., 1946," pages 780–781. Copy 178–44–1D.